July 10, 1951     O. H. SCHMITT     2,560,132
UNBALANCED MAGNETOMETER
Filed Jan. 1, 1944
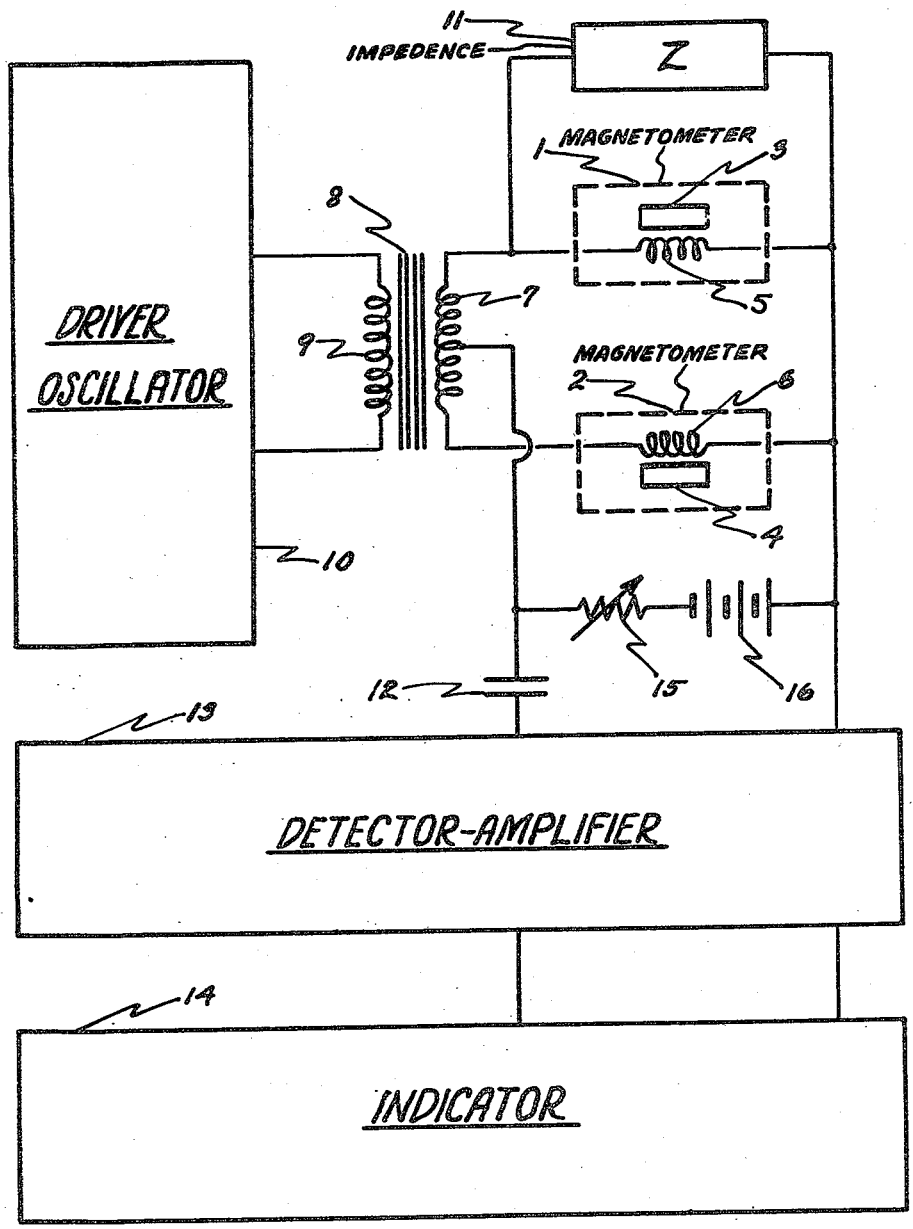
INVENTOR
OTTO H. SCHMITT
BY
ATTORNEY Patented July 10, 1951

2,560,132

UNITED STATES PATENT OFFICE 2,560,132

UNBALANCED MAGNETOMETER

Otto H. Schmitt, Port Washington, N. Y., assignor to the United States of America as represented by the Secretary of the Navy Application January 1, 1944, Serial No. 516,612

2 Claims. (Cl. 177—351)

This invention relates to an improved magnetometer for measuring magnetic fields, and more particularly to a magnetometer of the permeability type especially adapted for use in measuring changes in the earth's magnetic field. Such changes may be referred to as magnetic anomalies.

In the past, balanced magnetometers have been proposed which employ a pair of substantially identical magnetometer elements each having a magnetic core and at least one winding. A suitable alternating driving voltage was supplied to these windings, and the windings were suitably connected to a detector for the purpose of utilizing the output signal from the magnetometer elements. When the elements of such a magnetometer were exactly balanced, the output signal comprised primarily a series of peaks of a single polarity and having twice the frequency of the driving voltage, the amplitude of these peaks being dependent upon the strength of the magnetic field surrounding the magnetometer elements and the polarity of the peaks being a function of the direction of this magnetic field. A small change in the strength of the magnetic field being measured, therefore, was indicated by a corresponding change in the amplitude of the output signal. Such a relatively small change in the pulse amplitude was not only difficult to measure, but also necessitated maintaining the amplitude of the driving voltage within extremely close limits, due to the fact that changes in the amplitude of the latter also produced changes in the amplitude of the output signal.

It is an object of the present invention, therefore, to provide an improved magnetometer of the permeability type which is deliberately unbalanced by associating an impedance with one of the magnetometer elements, with the result that the output signal of the magnetometer comprises a series of pulses of alternate polarity. In such an arrangement, the presence or absence of a magnetic anomaly is indicated by the difference in the heights of the positive and negative pulses. Since this difference is greater than the change in either the positive or negative pulses taken alone, its detection is relatively easy. Furthermore, by thus utilizing the difference, the absolute values of the positive and negative pulses are no longer a predominant factor and hence the amplitude stability of the driving voltage is substantially less critical. The direction of the magnetic field being measured is indicated by the polarity of the pulses with respect to the driving voltage.

In accordance with the present invention, a magnetometer is provided which comprises a pair of substantially identical magnetometer elements each having a magnetic core and a winding. These magnetometer elements are disposed with their magnetic axes substantially parallel, and the windings are so connected that similar poles of the cores are oppositely directed. There is provided a bridge circuit having output terminals and including the windings and a source of alternating driving voltage, together with an impedance in the leg of the bridge circuit which includes one of the windings. As a result, the output signal appearing at the output terminals comprises a series of pulses of alternate polarity whose difference in magnitude is dependent upon the magnetic field surrounding the magnetometer elements, the magnitude of the individual peaks being dependent upon the value of the impedance.

For a better understanding of the invention, together with other and further objects thereof, reference is made to the following description taken in connection with the accompanying drawing, and its scope will be pointed out in the appended claims.

The single figure of the accompanying drawing shows, partly in block form, an improved magnetometer in accordance with the present invention.

Referring now to the drawing, there is shown a pair of magnetometer elements 1 and 2 having respectively magnetic cores 3 and 4 and windings 5 and 6. These cores and windings, although respectively substantially identical, have been designated by separate reference numerals for simplicity of explanation. Windings 5 and 6 are connected in series between the terminals of center-tapped secondary winding 7 of transformer 8. Primary winding 9 of transformer 8 is connected to the output of driver oscillator 10. Winding 5 of magnetometer element 1 is shunted by impedance element 11.

The center tap of winding 7 is connected, through capacitor 12, to one input terminal of detector-amplifier 13, the other input terminal of which is connected to the junction of windings 5 and 6. The output of detector-amplifier 13 is connected to indicator 14.

A series network comprising variable resistor 15 and battery 16 is connected between the center tap of winding 7 and the junction of windings 5 and 6.

It will be understood that the two magnetic cores, 3 and 4 in the drawing, may be disposed coaxially instead of side by side as shown, or that they may be replaced by a single core on which both of windings 5 and 6 are mounted. These modifications are within the scope of the invention.

In operation, driver oscillator 10 provides an alternating driving voltage, which is preferably but not necessarily sinusoidal in wave form. By means of transformer 8, this driving voltage is impressed upon windings 5 and 6, with the result that magnetic cores 3 and 4 are periodically driven, first in one direction and then in the other, well beyond their magnetic saturation points. Due to the presence of impedance element 11 associated with magnetometer element 1, however, magnetic cores 3 and 4 will not be driven to the same degree of saturation by the driving voltage. By so selecting impedance 11 that the unbalance of the two magnetometer elements 1 and 2 is substantial, the sharply peaked resultant pulse voltages which are induced in windings 5 and 6 will produce an output signal comprising a series of pulses of alternate polarity. It is this pulsed output signal which is supplied, through capacitor 12, to detector-amplifier 13. The latter unit is responsive to the difference in magnitude of the alternate positive and negative pulses comprising the output signal, and its demodulated and amplified output is in turn supplied to indicator 14, which provides a visual or graphical or other suitable indication of the magnetometer output.

The purpose of variable resistor 15 and battery 16 is to provide an adjustable direct current which flows in the same direction through windings 5 and 6, and which thus serves to balance out the effect of the earth's magnetic field in those cases where a small change in the field is the quantity to be measured. It will be understood that the arrangement for supplying this direct current may be modified or eliminated without departing from the scope of the present invention.

The magnitude of the individual peaks in the output signal from the magnetometer elements, and to a lesser extent the difference in their magnitudes, may be varied between relatively wide limits by changing the value of impedance element 11 shown in the drawing. It is possible that the necessary unbalance may even be secured without the necessity of a separate impedance element, by taking full advantage of the usual small differences in the characteristics of the windings and of the cores of the magnetometer elements. However, the slight unbalance usually encountered in practical embodiments is in general entirely inadequate to provide the distinctive alternate positive and negative pulses which are a feature of the present invention. This is due to the fact that the output of a magnetometer in which the individual elements are only slightly unbalanced due to incidental inequalities of the circuit elements comprises either a series of pulses all of the same polarity or, if the pulses are of different polarity, they are of such small magnitude as to be almost entirely masked by the spurious responses inherent in the usual permeability magnetometer. In practice, therefore, it has been found expedient to employ as impedance element 11 a resistor having an appropriate value, this value being readily determined by experiment to provide the maximum difference in the heights of the positive and negative pulses in the presence of a magnetic anomaly.

In one practical embodiment of the invention, for example, employing 2000-turn windings on each magnetometer element, a resistor of 40,000 ohms was found to be entirely satisfactory. The frequency of the driving voltage in this case was 318 cycles per second. It will be understood, of course, that an equivalent reactive impedance would have produced substantially the same degree of unbalance. Furthermore, the unbalancing impedance may be in series with one of the magnetometer windings, instead of in shunt as shown in the drawing.

What I have done by deliberately unbalancing the electrical properties of the two magnetometer elements, is to vary their inductance, resistance or capacitance to a proper extent. This is accomplished by providing two similar magnetometer elements and using a resistor or other impedance in shunt with one of the said elements. This arrangement is much more practical, from a production standpoint, than to rely on the dimensions and mechanical treatment of the core, the winding geometry, and many factors which could be counted on for this unbalance.

Curves obtained from an electrically unbalanced magnetometer in zero magnetic field in a constant current system, show that one magnetometer, with a higher impedance, has higher and narrower loops than the other magnetometer. The slight difference in height is not significant, but the difference in time of voltage build-up and decay causes sharp peaks to be obtained when the two magnetometer curves are subtracted from each other. Sharp voltage peaks are obtained which alternate above and below the zero line just as the loops in the curves alternate.

Battery 16 and resistor 15 are for the purpose of neutralizing the earth's magnetic field. The difference in inductance between the two magnetometer elements in this unbalanced, saturated-core magnetometer is obtained by impedance Z.

While the above mentioned curves were described for an imaginary constant current system, the results obtained with the actual apparatus in the present application are much the same. Also the curves are substantially the same as those realized when the magnetometer is in an unneutralized magnetic field. The loops of the two magnetometer element curves may be shifted in an unsymmetrical manner to increase the peak height on one side of the zero line and to correspondingly decrease the reverse peak height below said line.

The unbalance required to change from the balanced to the unbalanced bridge magnetometer is appreciable. Thus the peaks are raised well above the unintended and unavoidable minimum of "hash" in the output, so that the diminished peaks will be above the "hash" level.

It is possible to adjust the amplifier in the balanced bridge magnetometer of the saturated or unsaturated type, so that it cuts off at the "hash" level. However, this reduces the minimum field strength measurable to one above the "hash" response level. Since it is possible to take the difference between the peaks in the present unbalanced type, the minimum sensitivity is independent of the hash level. Furthermore, any lack of stability in the A.-C. drive in the balanced, saturated-core bridge will cause a proportional error in output readings, whereas the unbalanced bridge substantially eliminates this effect. Also, the alternating peak output of the present invention makes it especially advantageous to use a highly desirable type of amplifier which forfeits much advantage when applied to the unsaturated type of balanced magnetometer now known.

It will be understood that the arrangement of the present invention may be employed equally successfully in magnetometers of the so-called four-coil type, in which each magnetometer element is provided with separate coils for driving and for development of an output signal. In such a case, the unbalancing impedance is preferably associated with the driving coil of one of the magnetometer elements.

In addition to its use for measuring the earth's magnetic field or small changes therein, the magnetometer in accordance with the present invention is especially well adapted for use in securing magnetic stabilization or orientation of a plane in a desired position with respect to the earth's magnetic field, in accordance with the general disclosure by D. G. C. Hare in copending application Serial No. 529,003, filed March 31, 1944.

It will be understood, by those skilled in the art, that the apparatus herein disclosed, while shown and described as a magnetometer, may be utilized equally well as a gradiometer for measuring the difference of a magnetic field at two points. To accomplish this, the connections to one of the element windings are reversed. The arrangement for neutralizing the effect of the earth's field, if employed at all, must be altered so that the direct-current flow through the two windings is still in the same direction.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a magnetometer, the method of producing an output voltage consisting of a series of pulses of alternate polarity whose difference in magnitude is dependent upon the magnetic field, which comprises the steps of impressing an alternating driving voltage upon a pair of substantially identical magnetometer elements by means of a bridge circuit for driving the cores of said elements into saturation, unbalancing said bridge circuit by associating an impedance with one of said elements so as to unbalance the circuit in zero magnetic field, and utilizing as said output voltage the voltage that appears across a diagonal of said bridge circuit.

2. A magnetometer comprising a pair of substantially identical magnetometer elements each having a magnetic core and a winding, said magnetometer elements being disposed with their magnetic axes substantially parallel and said windings being so connected that similar poles of said cores are oppositely directed, a bridge circuit having output terminals and including said windings and a source of alternating driving voltage for driving the cores of said elements into saturation, and an impedance in the leg of said bridge circuit which includes one of said windings for unbalancing the circuit in zero magnetic field, whereby the output signal appearing at said output terminals comprises a series of pulses of alternate polarity whose difference in magnitude is dependent upon the magnetic field surrounding said magnetometer elements, the magnitude of the individual peaks being dependent upon the value of said impedance.

OTTO H. SCHMITT.

REFERENCES CITED

The following references are of record in the file of this patent:

UNITED STATES PATENTS

| Number | Name | Date |
|---|---|---|
| 2,252,059 | Barth | Aug. 12, 1941 |